(12) United States Patent
Lloyd et al.

(10) Patent No.: US 6,836,676 B2
(45) Date of Patent: Dec. 28, 2004

(54) SPEAKERPHONE ACCESSORY

(75) Inventors: Grant Harries Lloyd, Lawrenceville, GA (US); Charles S. Baxter, Lawrenceville, GA (US); Paul James Faerber, Lawrenceville, GA (US); David Townsend, Village of Lakewood, IL (US)

(73) Assignee: Motorola, Inc., Schaumburg, IL (US)

( * ) Notice: Subject to any disclaimer, the term of this patent is extended or adjusted under 35 U.S.C. 154(b) by 546 days.

(21) Appl. No.: 10/003,153

(22) Filed: Nov. 2, 2001

(65) Prior Publication Data

US 2003/0087676 A1 May 8, 2003

(51) Int. Cl.[7] .............................. H04M 1/00; H02J 7/00
(52) U.S. Cl. ................. 455/569.1; 455/556.1; 455/575.1; 455/90.3; 379/420.01; 379/420.04
(58) Field of Search .................... 455/556.1, 569.1, 455/550.1, 573, 575.1, 90.3; D14/138; 381/353; 379/420.01, 420.02, 420.04; 320/113, 107; D13/107

(56) References Cited

U.S. PATENT DOCUMENTS

| | | | | |
|---|---|---|---|---|
| 5,487,182 A | * | 1/1996 | Hansson | 455/569.1 |
| 5,588,041 A | * | 12/1996 | Meyer et al. | 455/569.2 |
| 5,749,057 A | * | 5/1998 | Takagi | 455/569.2 |
| 6,016,346 A | * | 1/2000 | Rittmueller et al. | 379/420.02 |
| 6,035,221 A | | 3/2000 | Snyder et al. | |
| 6,127,802 A | * | 10/2000 | Lloyd et al. | 320/107 |
| D436,576 S | * | 1/2001 | Herrmann et al. | D13/107 |
| 6,266,542 B1 | * | 7/2001 | Stern et al. | 455/569.1 |
| 6,344,727 B1 | * | 2/2002 | Desai et al. | 320/107 |
| 6,526,150 B2 | * | 2/2003 | Kelly et al. | 455/569.1 |
| 6,625,469 B1 | * | 9/2003 | Hwang et al. | 455/550.1 |
| 6,718,182 B1 | * | 4/2004 | Kung | 455/556.1 |
| 6,775,557 B2 | * | 8/2004 | Tsai | 455/556.1 |
| 2002/0183101 A1 | * | 12/2002 | Oh et al. | 455/569 |

* cited by examiner

*Primary Examiner*—David Hudspeth
*Assistant Examiner*—Kamran Afshar
(74) *Attorney, Agent, or Firm*—Philip H. Burrus, IV

(57) ABSTRACT

This invention includes a speakerphone accessory suitable for connection to either a battery charger having a phone in its pocket or to a cellular telephone. The speakerphone module includes a hemispherical upper housing. The upper housing includes a circular dimple aperture and a wave directing cap. The hemispherical shape, aperture and cap all contribute to directing acoustic waved generated by a speaker disposed within the housing radially from the module in all directions. One embodiment of the module includes a second terminal for passing data and power through the module, allowing the module to be coupled serially between devices. The module also includes a bottom housing having a generally hemispherical shape. The bottom housing provides stability to the connection between the module and a peripheral device in that it reduces the mechanical advantage given to forces incident upon the upper housing acting upon the main terminal.

14 Claims, 4 Drawing Sheets

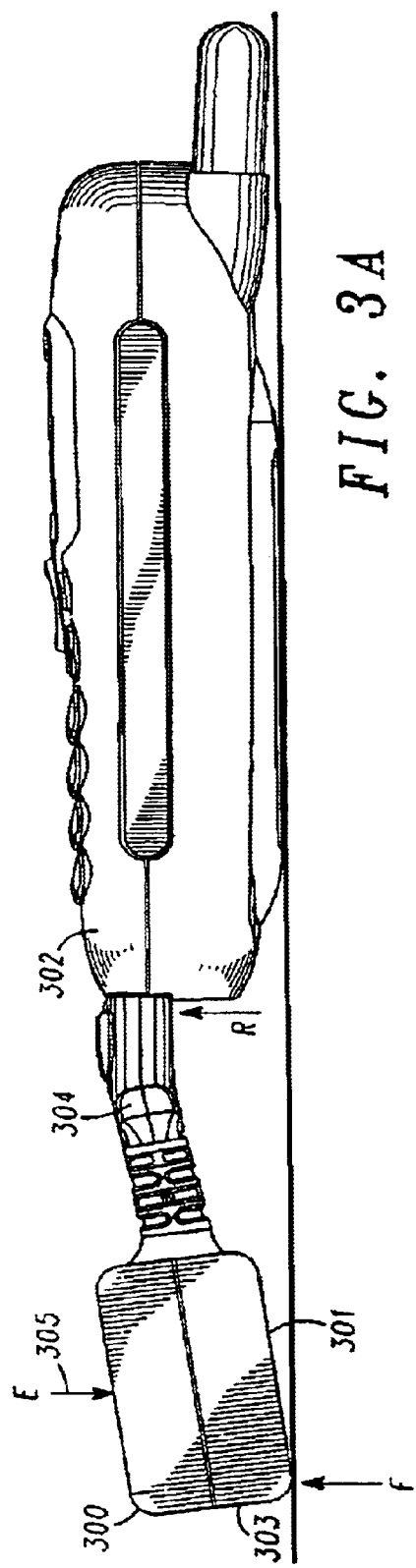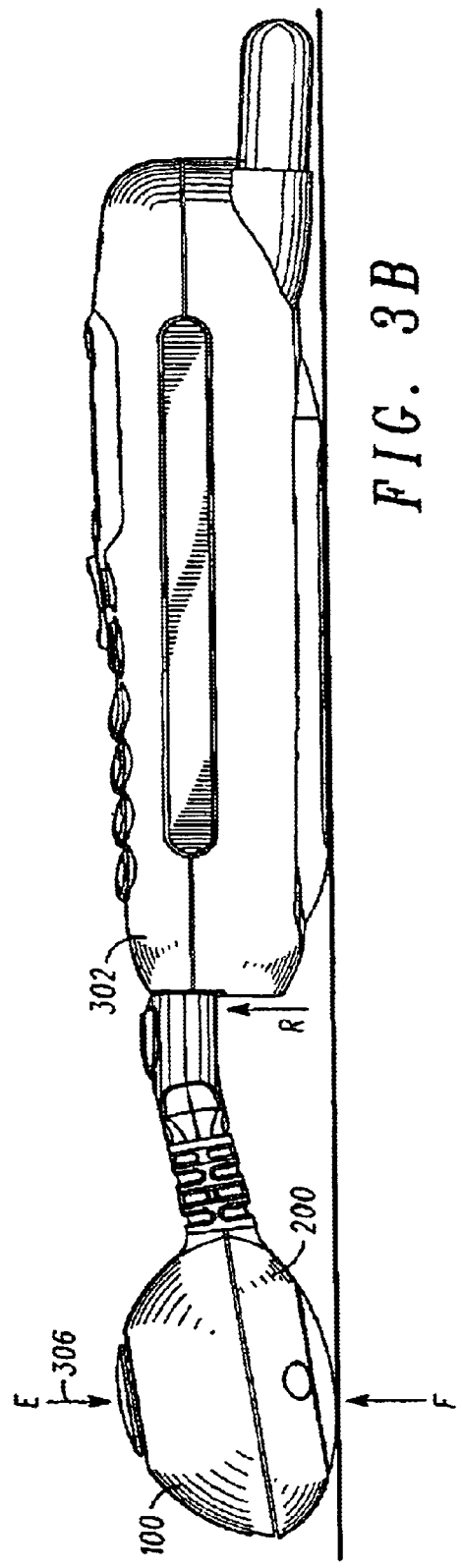

SPEAKERPHONE ACCESSORY

BACKGROUND

1. Technical Field

This invention relates generally to speakerphones, and more particularly, to a speakerphone module having a universally accommodating form factor that is connectible to either a cellular telephone or battery charger.

2. Background Art

Conference calls have become an everyday occurrence in business. Speakerphones are often used during these conference calls. Due to their relatively small size, cellular telephones are generally not well suited for use as speakerphones. As the normal audio output from a cellular phone is designed for single-user, close range only, it is difficult for large numbers of people to huddle around a cellular phone and hear the caller on the other end. People attempting to do this often bump heads with each other and become quite grouchy.

To alleviate this problem, manufacturers have developed speakerphone accessories. These speakerphones couple electrically and mechanically to the cellular telephone to provide speaker phone functionality. The units often involve speakerphone circuitry that is built into a cellular battery-charging unit. Sometimes the recharging units are desktop chargers (meaning they charge a battery on the phone only) or multi-chargers (meaning that they also charge a spare battery). As the user must buy a desktop charger just to get a speaker phone accessory, this design greatly limits a consumer's choice. Additionally, the user must aim the speaker of the speakerphone in his or her direction for maximum effectiveness. This "aiming" is cumbersome and time consuming.

There is thus a need for an improved speakerphone accessory.

BRIEF DESCRIPTION OF THE DRAWINGS

FIG. 3A is a speakerphone module having a square bottom housing.

FIG. 3B is a cross-sectional view of a speakerphone module having a universally accommodating form factor in accordance with the invention illustrating decreased dislodging mechanical advantage.

DETAILED DESCRIPTION OF THE INVENTION

Figure 1:
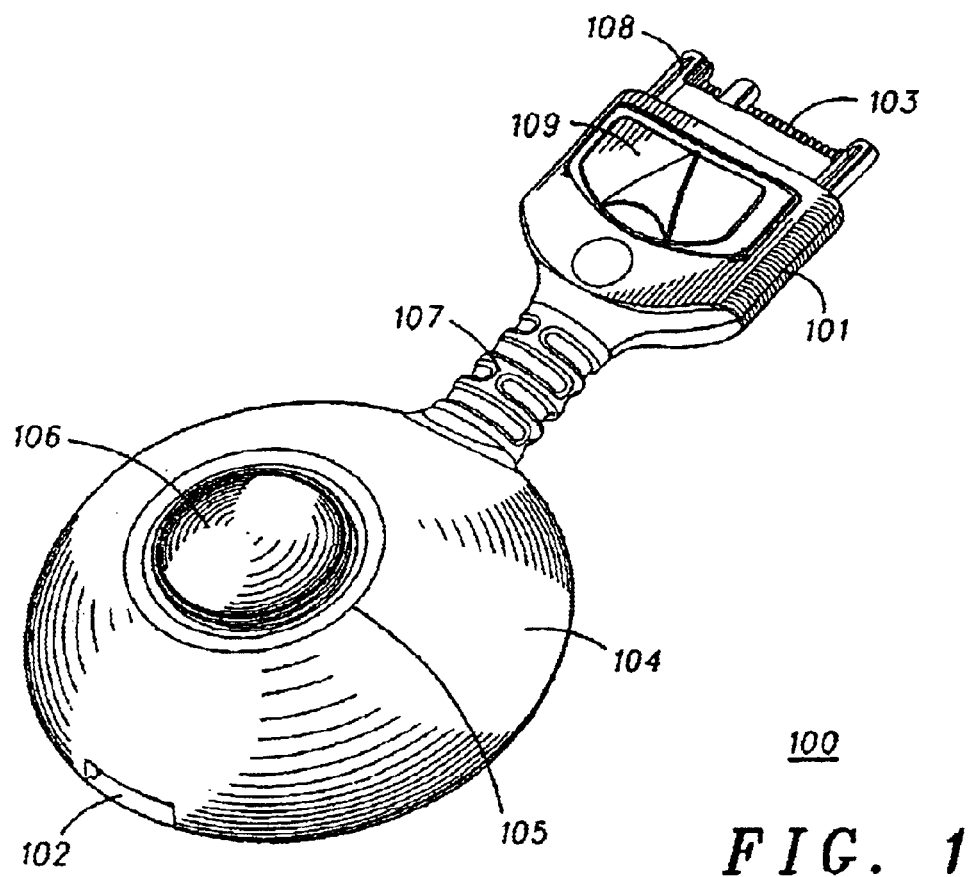
FIG. 1 is an isometric view of a speakerphone module having a universally accommodating form factor in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes a speakerphone housing having a universally accommodating form factor. The unique form factor allows the speakerphone to be both aesthetically and aurally pleasing regardless of the device to which it is coupled. In one embodiment, the invention may be coupled to cellular telephones having a variety of form factors. The invention may also be coupled to desktop chargers and/or power supplies.

Referring now to FIG. 1, illustrated therein is a preferred embodiment of a speakerphone module 100 having a universally accommodating form factor in accordance with the invention. The speakerphone module 100 includes a main terminal 101 and an optional secondary terminal 102.

The main terminal 101 comprises an electrical and mechanical connector designed to suit a particular type of cellular telephone (not shown). The main terminal 101 includes pins 103 for coupling audio signals, and alternatively power and data, to and through the speakerphone module 100.

In one preferred embodiment, the main terminal 101 comprises a 17-pin CE bus data plug. In this particular embodiment, data passes along 14 pins, while three are reserved for power and ground. Audio signals are included in the "data" carried along the 14 data pins.

In the standard operating mode, the main terminal 101 delivers audio from the phone to the speaker (not shown) disposed within the speakerphone module 100. When the optional secondary terminal 102 is employed, the pins 103 of the main terminal 101 may couple and transmit audio, data, power and control signals from the phone, through the speakerphone module 100, to another accessory coupled serially to the speakerphone module.

The speakerphone module 100 includes numerous advantages over the prior art, as will become evident from the following discussion. Two particular advantages are worthy of note here: First, the speakerphone module 100 includes an upper housing 104 that is generally hemispherically shaped. The housing 104 also includes a circular dimple aperture 105, with a wave-directing cap 106 coupled thereon. The spherical shape of the housing 104 helps broadcast audio sounds from the speaker uniformly in all directions. The circular dimple aperture 105 and wave directive cap 106 assist in this function, in that they serve as audio waveguides for sound waves emanating from the speaker. Thus, the user need not "aim" a flat-faced speaker towards his ear to be able to hear effectively. When the speakerphone module 100 (coupled to a phone) is placed on a desk, audio sounds are transmitted radially in 360 degrees, allowing each user to hear an aurally pleasing sound.

Second, this invention takes advantage of the microphone embedded in the phone. The speakerphone module 100 does not include a microphone. Rather, when the speakerphone module 100 is coupled to the phone, the phone recognizes the speakerphone module 100 via the main terminal 101. Once the phone identifies the presence of the speakerphone module 100, the phone automatically increases the gain of the phone's internal microphone. By using the microphone in the phone, the invention solves two problems. It reduces part count, thereby reducing cost and manufacturing time, and increasing reliability. Next, it prevents audio feedback issues that cause speakers in close proximity to microphones to "squeal". Squealing is aurally unpleasant.

The speakerphone module 100 also includes a link 107 between the main terminal 101 and the housing 104. While the link 107 may be a connector made of rigid material like polycarbonate, or may be a flexible cable, in one preferred embodiment it comprises a semi-flexible strain relief. The strain relief may be manufactured out of plastics or polymers, but is rigid enough to withstand forces applied in linear directions away from the main terminal. Additionally, a latch 108 with an actuating button 109 may be includes to further withstand such forces.

As mentioned, the speakerphone module 100 includes a speaker for delivering audio from the phone, through the main terminal 101, to the user. The speakerphone module 100 may also comprise amplification circuitry. The amplification circuitry may be powered from a single-use or rechargeable battery disposed in the speakerphone module 100, or it may be powered from a power supply coupled to the optional secondary terminal 102.

In use, audio signals from the cellular telephone are received by the main terminal 101 for processing before being supplied to the speaker or optional audio output amplifier circuits. These audio signals are then delivered to the user via the speaker, the circular dimple aperture 105, the housing 104 and the wave directive cap 106.

Figure 2:
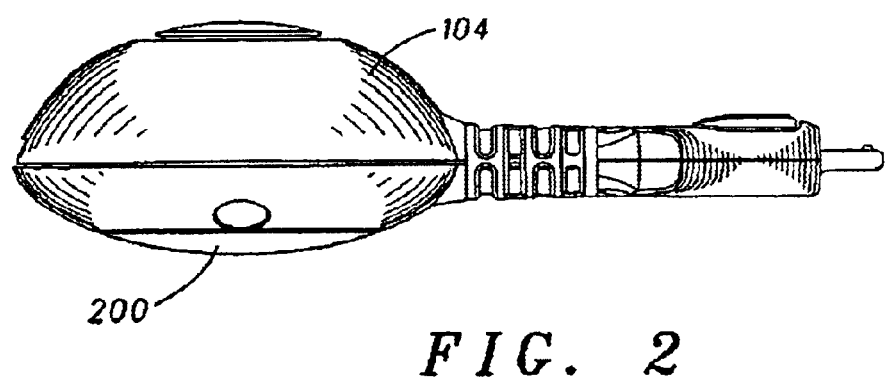
FIG. 2 is an elevated side view of a speakerphone module having a universally accommodating form factor in accordance with the invention.

Referring now to FIG. 2, illustrated therein is an elevated side-view of a preferred embodiment of the invention. From this perspective, the bottom housing 200 can be seen. The bottom housing 200 is generally curved in shape. The curved shape allows the speakerphone module to accommodate devices having varying form factors.

When the speakerphone module is coupled to a phone or charger, the bottom housing 200 curvature ensures that when the assembly is placed on a flat surface, the flat surface is always tangent to the bottom housing 200. Thus, when a force is applied to the top housing in a direction perpendicular to the flat surface, e.g. someone drops a hand, book, or other object on the speakerphone module, the curvature of the bottom housing 200 resists rotation as the tangential point aligns the fulcrum and the force. (For exemplary purposes, "effort" and "force" will be used interchangeably, so the "e" in effort may be distinguished from the "f" in fulcrum.)

This is best illustrated by example. Referring now to FIG. 3A, illustrated therein is a speakerphone module 300 having a square bottom housing 301. Here, when the speakerphone module 300 is coupled to a phone 302 having a form factor higher than that of the speakerphone module 300, the speakerphone module 300 becomes a class III lever assembly. The rear portion 303 of the speakerphone module 300 acts as a fulcrum, while the connector 304 acts as the resistance. Effectively, the speakerphone module 300 gives mechanical advantage to the effort to dislodge the speakerphone module 300 from the phone 302. As dislodging causes the speakerphone module 300 to cease working, it is undesirable.

By contrast, as illustrated in FIG. 3B, the present invention enhances mechanical stability by reducing or eliminating this mechanical advantage. With the rounded bottom housing 200, the fulcrum becomes the tangential point, which is directly below the effort 306 where the effort 306 passes through the center of the speakerphone module 100. Where the effort 306 does not pass through the center, the mechanical advantage is still reduced in that the fulcrum is no longer at the end of the speakerphone module 100. This greatly enhances the stability and reliability of the module 100.

Figure 4A:
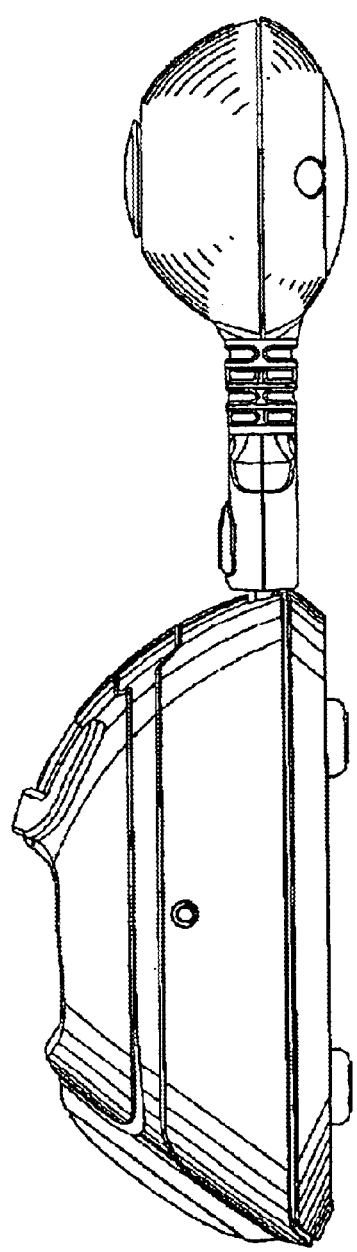
FIG. 4A is a speakerphone module having a universally accommodating form factor coupled to a charger in accordance with the invention.
Figure 4B:
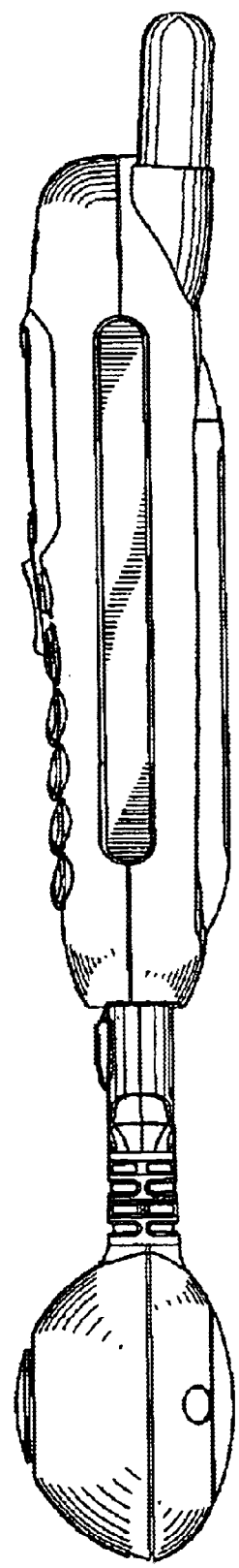
FIG. 4B is a speakerphone module having a universally accommodating form factor coupled to a cellular phone in accordance with the invention.

FIGS. 4A and 4B illustrate the versatility of the invention in that it may be coupled to either a charger or a phone. As the optional secondary terminal mentioned with respect to FIG. 1 can serve as a pass-through port for power, the speakerphone module may be coupled serially between a charger and a power supply. The charger need only have a mating connector similar in form factor to that of the phone. Thus, when a phone is inserted into the pocket of the charger, the charger is able to deliver audio through the charger to the speakerphone module. The connectibility to both chargers and phones adds a degree of freedom to the user, in that the phone's battery may now be charged while the phone itself is in use as a speakerphone.

Likewise, as many phones now include internal charging circuitry, the speakerphone module may be coupled serially between a power supply and phone. In this configuration, the phone's battery may also be charged while the phone itself is in use as a speakerphone.

Figure 5A:
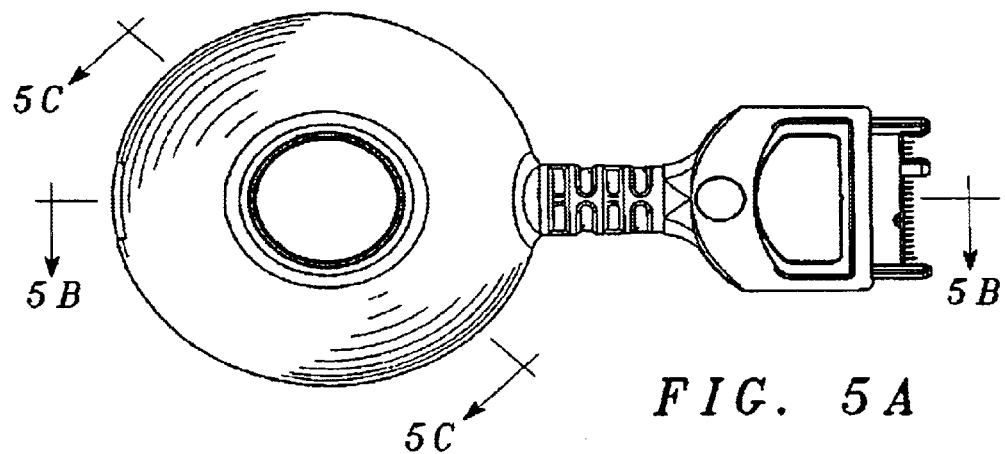
FIGS. 5A–C are cross-sectional views of a speakerphone module having a universally accommodating form factor illustrating the circular dimple aperture and wave directing cap in accordance with the invention.
Figure 5B:
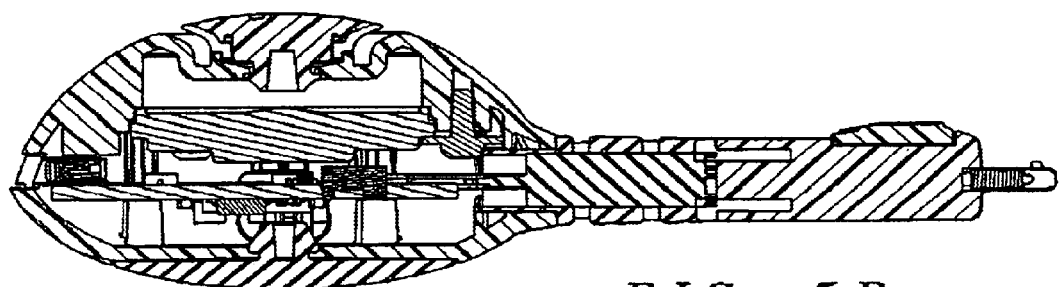
Figure 5C:
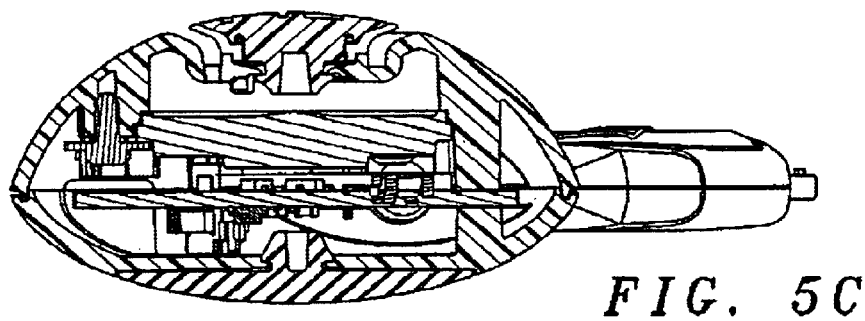

FIG. 5 is a cross sectional view of a preferred embodiment of the speakerphone module illustrating the shape and contour of the circular dimple aperture and the wave directing cap. The figure has been drawn to scale, thereby best illustrating this preferred embodiment.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, the electrical circuits that may be included with this invention are numerous. One example is U.S. Pat. No. 5,588,041, assigned to Motorola, incorporated herein by reference for all purposes. Another example is the Nextel i1000 phone manufactured by Motorola, which includes a built-in speakerphone circuit. A third example is U.S. Pat. No. 5,802,167, issued to Hong, which is incorporated herein by reference.

What is claimed is:

1. A speakerphone module, the module comprising:
    a. a housing, the outer structure comprising as upper housing, the upper housing having a generally hemispherical shape;
    b. a circular dimple aperture disposed on the upper housing;
    c. a loudspeaker disposed within the housing;
    d. a main terminal for coupling electrical signals to the loudspeaker; and
    e. a link mechanically coupling the main terminal to the housing;
    wherein when the loudspeaker is actuated, the upper housing and circular dimple aperture facilitate acoustic waves that propagate radially from the module.

2. The module of claim 1, wherein the main terminal supports either the portable battery charger or a cellular telephone.

3. The module of claim 2, further comprising a microphone, wherein the microphone is disposed in a peripheral device coupled to the main terminal.

4. The module of claim 2, further comprising a wave-directing cap disposed generally in the center of the circular dimple aperture.

5. The module of claim 4, further comprising a secondary terminal, wherein the secondary terminal facilitates electrically coupling power from an auxiliary device to the main terminal when the module is coupled to the auxiliary device.

6. The module of claim 5, wherein the main terminal further comprises a plurality of pins, with a first subset of the plurality dedicated to transmitting power between the secondary terminal and the main terminal, and a second subset of the plurality dedicated to transmitting data between the speaker and the main terminal.

7. The module of claim 6, wherein the main terminal comprises a 17-pin, male connector.

8. The module of claim 1, further comprising means for reducing the mechanical advantage given to forces incident upon the upper housing acting on the main terminal.

9. The module of claim 8, the means for reducing mechanical advantage comprising a bottom housing having a generally hemispherical shape.

10. The module of claim 9, wherein when the module is mechanically coupled to another device and rests on a horizontal surface, the surface contacts the bottom housing in a tangential fashion.

11. The module of claim 10, wherein the main terminal accommodates electricity connecting the module to both a cellular telephone or to a battery charger, but not at the same time.

12. The module of claim 11, further comprising means for connecting the module to different types of peripheral accessories.

13. The module of claim 12, wherein the means for connecting the module to different types of peripheral devices comprises bottom housing having a generally hemispherical shape.

14. The module of claim 13, wherein the peripheral devices are selected from the group consisting of radios, phones, power supplies and battery chargers.

* * * * *

UNITED STATES PATENT AND TRADEMARK OFFICE
CERTIFICATE OF CORRECTION

PATENT NO. : 6,836,676 B2
DATED : December 28, 2005
INVENTOR(S) : Lloyd et al.

It is certified that error appears in the above-identified patent and that said Letters Patent is hereby corrected as shown below:

<u>Title page,</u>
Item [57], ABSTRACT,
Line 7, the words "directing acoustic waved" should read -- directing acoustic waves --.

<u>Column 4,</u>
Line 40, the words "comprising as upper" should read -- comprising an upper --.

Signed and Sealed this

Sixteenth Day of August, 2005

JON W. DUDAS
*Director of the United States Patent and Trademark Office*